US012338179B2

(12) United States Patent
Skala

(10) Patent No.: US 12,338,179 B2
(45) Date of Patent: Jun. 24, 2025

(54) REFRACTORY MATERIAL WITH TAGGANT TO ENABLE IDENTIFICATION OF MATERIAL DURING RECLAIMING PROCESS

(71) Applicant: HarbisonWalker International Holdings, Inc., Moon Township, PA (US)

(72) Inventor: Korey Skala, Roswell, GA (US)

(73) Assignee: HarbisonWalker International Holdings, Inc., Moon Township, PA (US)

( * ) Notice: Subject to any disclaimer, the term of this patent is extended or adjusted under 35 U.S.C. 154(b) by 108 days.

(21) Appl. No.: 18/110,423

(22) Filed: Feb. 16, 2023

(65) Prior Publication Data

US 2024/0279122 A1   Aug. 22, 2024

(51) Int. Cl.
*C04B 33/13* (2006.01)
*B07C 5/34* (2006.01)
(Continued)

(52) U.S. Cl.
CPC .......... *C04B 33/131* (2013.01); *B07C 5/3412* (2013.01); *B07C 5/3427* (2013.01);
(Continued)

(58) Field of Classification Search
CPC ... B07C 5/3412; B07C 5/3427; C03C 4/0071; C03C 4/12; C03C 11/002; C03C 14/004; C04B 33/131

See application file for complete search history.

(56) References Cited

U.S. PATENT DOCUMENTS 8,960,028 B2   2/2015 Lambert et al.
9,194,745 B2 * 11/2015 Ackley ................ B07C 5/34
(Continued)

FOREIGN PATENT DOCUMENTS

WO   WO-2021/030775 A1   2/2021

OTHER PUBLICATIONS

CN 114180954 A with English Translation attached; Inventor: Tong et al.; Pub. Date: Mar. 2022 (Year: 2022).*
(Continued)

*Primary Examiner* — Joseph C Rodriguez
(74) *Attorney, Agent, or Firm* — RENNER, OTTO, BOISSELLE & SKLAR, LLP

(57) ABSTRACT

A refractory material for forming a refractory product includes a refractory component and a taggant having an amorphous or a crystalline solid dispersed within the refractory material. The taggant is configured to be distinguishable from the refractory component after heating of the refractory product between 300 degrees F. and 3500 degrees F. A method of reclaiming refractory material of a refractory lining constructed from different types of refractory products, the refractory lining having been subjected to temperatures in excess of 300 degrees F., includes demolishing the refractory lining to produce a mixture of refractory pieces of different types of refractory products. The mixture of refractory pieces is analyzed to detect the presence of one or more taggants, and the refractory pieces are sorted into groups based on the detected one or more taggants.

18 Claims, 4 Drawing Sheets

(51) Int. Cl.
*B07C 5/342* (2006.01)
*C03C 4/00* (2006.01)
*C03C 4/12* (2006.01)
*C03C 11/00* (2006.01)
*C03C 14/00* (2006.01)
*C09K 15/02* (2006.01)

(52) U.S. Cl.
CPC .............. *C03C 4/0071* (2013.01); *C03C 4/12* (2013.01); *C03C 11/002* (2013.01); *C03C 14/004* (2013.01); *C09K 15/02* (2013.01); *C03C 2204/00* (2013.01); *C04B 2235/528* (2013.01)

(56) References Cited

U.S. PATENT DOCUMENTS

| | | | |
|---|---|---|---|
| 10,099,961 B2* | 10/2018 | Kincaid | G01N 21/64 |
| 2010/0222917 A1* | 9/2010 | Bohlig | B07C 5/342 |
| | | | 235/375 |
| 2013/0035422 A1* | 2/2013 | Freund | C04B 40/0039 |
| | | | 977/773 |
| 2015/0159082 A1* | 6/2015 | Lee | C11D 3/2096 |
| | | | 252/301.36 |
| 2017/0167982 A1* | 6/2017 | Doucet | G01N 21/718 |
| 2019/0169073 A1 | 6/2019 | Backhaus-Ricoult et al. | |
| 2019/0329297 A1* | 10/2019 | Moesslein | C09K 11/7769 |

OTHER PUBLICATIONS

Zhang, H., Zhao, H., Chen, J., Li, J., Yu, J., & Nie, J. (2013). Defect Study of MgO—CaO Material Doped with CeO2. *Advances in Materials Science and Engineering*, 2013.

NPL—Daigo, I., Kiyohara, S., Okada, T., Okamoto, D., & Goto, Y. (Jun. 2018). Element-based optimization of waste ceramic materials and glasses recycling. *Resources, Conservation and Recycling*, 133, 375-384.

Bazhukova, I. N., Sokovnin, S. Y., Ilves, V. G., Myshkina, A. V., Vazirov, R. A., Pizurova, N., & Kasyanova, V. V. (2019). Luminescence and optical properties of cerium oxide nanoparticles.

* cited by examiner

REFRACTORY MATERIAL WITH TAGGANT TO ENABLE IDENTIFICATION OF MATERIAL DURING RECLAIMING PROCESS

FIELD OF THE INVENTION

The present invention relates generally to refractory materials and, more particularly, to a refractory material having a taggant, method for incorporating a taggant into a refractory material, and a method for sorting a mixture of demolished, spent refractory products based on the taggant.

BACKGROUND OF THE INVENTION

Metallurgical vessels include refractory linings that protect the vessel from the high temperatures encountered during a metallurgical process. After the linings reach their useful life, the residual linings of metallurgical vessels are demolished, the metallurgical vessels are cleaned or repaired and subsequently relined with new refractory linings. The demolished, spent linings are either disposed or subjected to one of the common recycling/reclaiming processes.

Conventionally, recycling of refractory materials is based on multi-step sorting and processing before the material can be used in further applications from pavement to re-use in new refractories. A primary consideration for recycled materials reuse in new refractory is the potential for contamination of one refractory product type by another refractory product type, which can occur during demolition and removal of spent refractory linings. This contaminated material can limit the scope of use in new refractories, due to associated decline in properties of products made therefrom. Different refractory product types, often used within the same high temperature process vessel, not limited to metallurgy, which are able to contaminate one another, include: alumina-magnesia-carbon, alumina-silicon carbide-carbon, alumina, alumina-silica, doloma, doloma-carbon, magnesia, magnesia-alumina-carbon, magnesia-carbon, magnesia-chrome, etc.

A second consideration for contamination arises from refractory products containing Aluminum metal and Carbon. Many resin or pitch bonded refractories contain Aluminum metal or alloy (a strong reductant) in the recipe, to inhibit oxidation of the graphite and carbon-containing constituents. This combination of Aluminum metal or alloy and Carbon (in or from graphite, carbon black, pitch, resin, or some other carbon carrier) forms Aluminum Carbide ($Al_4C_3$) in operation, and when cooled after use this $Al_4C_3$ resultant compound is hygroscopic, will be subject to the hydration reaction and subsequent destructive volumetric expansion. This hydration reaction can be detrimental to new refractory manufacture that utilizes this reclaimed material.

Existing recycling sorting methods include visual sorting, magnetic separation, and Laser Induced Breakdown Spectroscopy (LIBS). One or more of these methods may be used in attempt to separate different refractory types and remove unwanted materials.

Visual sorting involves sorting under visible light, either manually (e.g., by a person) or automatically (e.g., by a controller that executes instructions). Visual sorting is inadequate in discerning materials similar in appearance. Many refractory products, especially those with graphite additions, have a very similar appearance in the visible light spectrum, and therefore would not be able to be sorted from one another.

Magnetic separation includes using large electromagnets to attract and remove magnetic materials (iron, steel, etc.) from crushed, spent refractories thereby separating one type of magnetic material from other types of refractory materials. Magnetic separation is not applicable for separating multiple refractory types from one another, as refractories are generally not magnetic.

LIBS sorting includes targeting intact spent refractory products with a focused laser pulse, which determines the approximate composition of the mass, and diverts the material into the appropriate receptacle. With LIBS, each spent refractory product must be targeted and analyzed prior to crushing, with the results returning an elemental breakdown, but without indication as to the raw material quality or grade (e.g., fused magnesia vs. sintered magnesia, graphite vs. carbon black vs. pitch, etc.) of the raw material explicitly. This ability to separate classes of raw materials is critical for reuse in high purity refractories, or in large quantities, so as not to diminish the material properties. The LIBS method is also restricted to large, nearly intact, spent refractory products required for targeting of the laser.

SUMMARY OF THE INVENTION

The present invention incorporates a taggant into the composition of a refractory material during the manufacturing process of the refractory product. The role of the taggant is to identify the refractory material after its service life, after crushing/grinding of the spent refractory product, where a radiation source and detector are utilized to identify and sort the material to be recycled and reused in new refractory product manufacture.

According to one aspect of the invention, a refractory material for forming a refractory product includes: a refractory component; a taggant dispersed within the refractory material, the taggant configured to be distinguishable from the refractory component.

In one embodiment, the taggant is configured to be distinguishable from the refractory component after heating of the refractory product between 300 degrees F. and 3500 degrees F.

In one embodiment, the taggant comprises at least one a crystalline solid different from a crystalline solid part of the refractory component or an amorphous solid different from an amorphous solid part of the refractory component.

In one embodiment, the refractory material includes a binder material mixed with the refractory component, wherein the taggant is dispersed within the binder material.

In one embodiment, wherein the binder material comprises at least one of calcium aluminate cement, colloidal silica, hydratable alumina, phenolic resin, pitch, phosphate, starch, sugar, or sulfonate.

In one embodiment, the refractory material includes an antioxidant mixed with refractory component.

In one embodiment, the antioxidant comprises at least one of a metal powder or granules.

In one embodiment, the taggant is homogeneously dispersed within the refractory material.

In one embodiment, the taggant is configured to be detectable in changed or unchanged form after the refractory material is heated to a temperature between 300 degrees F. and 3500 degrees F.

In one embodiment, the taggant comprises the amorphous solid, the amorphous solid comprising a glass solid.

In one embodiment, the taggant comprises the amorphous solid, the amorphous solid including a glass component comprising at least one oxide of Scandium, Yttrium, Lanthanum, Cerium, Praseodymium, Neodymium, Promethium, Samarium, Europium, Gadolinium, Terbium, Dysprosium, Holmium, Erbium, Thulium, or Ytterbium.

In one embodiment, the taggant comprises the amorphous solid, the amorphous solid including a glass component comprising glass microspheres.

In one embodiment, the taggant comprises the crystalline solid, the crystalline solid including a metallic component comprising at least one of Nickel, Cobalt, Vanadium, Chromium, Copper, Barium, Tungsten, Platinum, Silver, Gold, Beryllium, Scandium, Yttrium, Lanthanum, Cerium, Prascodymium, Neodymium, Promethium, Samarium, Europium, Gadolinium, Terbium, Dysprosium, Holmium, Erbium, Thulium, or Ytterbium.

In one embodiment, the taggant comprises the crystalline solid, the crystalline solid including a metallic component configured to convert to an oxide or a carbide upon the refractory material being subjected to a temperature exceeding 300 degrees F.

In one embodiment, the taggant comprises the crystalline solid, the crystalline solid including at least one of metal carbide, or metal oxide.

In one embodiment, the taggant comprises the crystalline solid, the crystalline solid including at least one of Nickel carbide, Cobalt carbide, Vanadium carbide, Vanadium oxide, Copper carbide, Copper oxide, Barium Carbide, Barium Oxide, Tungsten Carbide, Tungsten oxide, Platinum Carbide, Platinum oxide, Silver Carbide, Silver oxide, Gold carbide, Gold oxide, Beryllium Carbide, Scandium Carbide, Yttrium Carbide, Lanthanum Carbide, Cerium Carbide, Prascodymium Carbide, Neodymium Carbide, Promethium Carbide, Samarium Carbide, Europium Carbide, Gadolinium Carbide, Terbium Carbide, Dysprosium Carbide, Holmium Carbide, Erbium Carbide, Thulium Carbide, Ytterbium Carbide, Beryllium Oxide, Scandium Oxide, Yttrium Oxide, Lanthanum Oxide, Cerium Oxide, Prascodymium Oxide, Neodymium Oxide, Promethium Oxide, Samarium Oxide, Europium Oxide, Gadolinium Oxide, Terbium Oxide, Dysprosium Oxide, Holmium Oxide, Erbium Oxide, Thulium Oxide, or Ytterbium Oxide.

According to another aspect of the invention, a brick refractory product or monolithic refractory product comprising the refractory material as described herein.

According to another aspect of the invention, a method of making a refractory product for forming a refractory, includes mixing at least one refractory component and a taggant, wherein the taggant comprises an amorphous or a crystalline solid that is distinguishable from an amorphous or crystalline solid of the refractory component.

In one embodiment, the method includes using an amorphous or a crystalline solid that is distinguishable from an amorphous or crystalline solid of the refractory component after heating of the mixture of refractory product between 300 degrees F. and 3500 degrees F.

In one embodiment, the method includes using at least one of a crystalline solid different from a crystalline solid part of the refractory component or an amorphous solid different from an amorphous solid part of the refractory component.

In one embodiment, the method includes shaping the mixture into a desired shape, and curing the shaped mixture.

In one embodiment, mixing includes mixing the taggant with a binder material, and subsequently mixing the refractory component with the mixed taggant and binder material.

In one embodiment, the method includes mixing an antioxidant with the refractory component.

In one embodiment, the antioxidant includes at least one of a metal powder or metal granules.

In one embodiment, the method includes selecting a taggant that is configured to change form upon the refractory material being subjected to a temperature exceeding 300 degrees F.

In one embodiment, the method includes selecting the amorphous solid as the taggant.

In one embodiment, the method includes selecting the amorphous solid as the taggant, wherein the amorphous solid comprises glass microspheres.

In one embodiment, the method includes selecting the crystalline solid as the taggant, wherein the crystalline solid comprises at least one of Nickel, Cobalt, Vanadium, Chromium, Copper, Barium, Tungsten, Platinum, Silver, Gold, Beryllium, Scandium, Yttrium, Lanthanum, Cerium, Prascodymium, Neodymium, Promethium, Samarium, Europium, Gadolinium, Terbium, Dysprosium, Holmium, Erbium, Thulium, or Ytterbium.

In one embodiment, the method includes selecting the crystalline solid as the taggant, wherein the crystalline solid comprises at least one of Nickel carbide, Cobalt carbide, Vanadium carbide, Vanadium oxide, Copper carbide, Copper oxide, Barium Carbide Barium Oxide, Tungsten Carbide, Tungsten oxide, Platinum Carbide, Platinum oxide, Silver Carbide, Silver oxide, Gold carbide, Gold oxide, Beryllium Carbide, Scandium Carbide, Yttrium Carbide, Lanthanum Carbide, Cerium Carbide, Praseodymium Carbide, Neodymium Carbide, Promethium Carbide, Samarium Carbide, Europium Carbide, Gadolinium Carbide, Terbium Carbide, Dysprosium Carbide, Holmium Carbide, Erbium Carbide, Thulium Carbide, Ytterbium Carbide, Aluminum Oxide, Beryllium Oxide, Scandium Oxide, Yttrium Oxide, Lanthanum Oxide, Cerium Oxide, or Praseodymium Oxide, Neodymium Oxide, Promethium Oxide, Samarium Oxide, Europium Oxide, Gadolinium Oxide, Terbium Oxide, Dysprosium Oxide, Holmium Oxide, Erbium Oxide, Thulium Oxide, or Ytterbium Oxide.

According to another aspect of the invention, a method of reclaiming refractory material of a refractory lining constructed from different types of refractory products, the refractory lining having been subjected to temperatures in excess of 300 degrees F., and at least some of the different types of refractory products are constructed as described herein, the method including: demolishing the refractory lining to produce a mixture of refractory pieces of different types of refractory products; analyzing the mixture of refractory pieces to detect the presence of one or more taggants; and sorting the refractory pieces into groups based on the detected one or more taggants.

In one embodiment, the method includes demolishing includes crushing the mixture of refractory pieces into smaller pieces.

In one embodiment, the method includes analyzing comprises optically analyzing the refractory pieces.

In one embodiment, analyzing includes using Spectroscopy to analyze the refractory pieces.

In one embodiment, analyzing includes using Laser Induced Breakdown Spectroscopy to analyze the refractory pieces.

In one embodiment, analyzing includes exciting the refractory pieces to cause photoluminescent emissions from the taggants, detecting the photoluminescent emissions, and sorting the refractory pieces based the detected photoluminescent emissions.

In one embodiment, analyzing further includes detecting a type of taggant in at least some of the pieces.

In one embodiment, detecting the type of taggant further includes detecting that the taggant has changed from one state to another state.

Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well-known process operations have not been described in detail so as to not unnecessarily obscure the present invention.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1A:
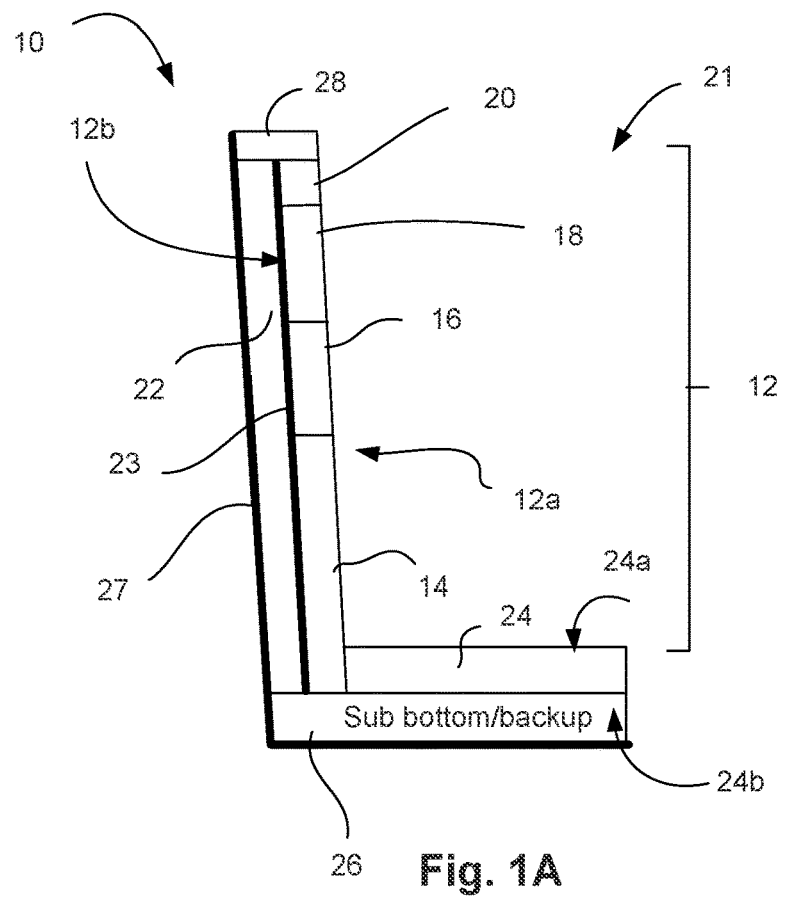
FIGS. 1A and 1B are simple schematic views of exemplary metallurgical vessels.

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

The term "refractory component" refers to a mixture of one or more primarily inorganic nonmetal materials, such as fused magnesia, sintered magnesia, dolomite, magnesia-alumina spinel, calcined, tabular or white fuse alumina, calcined bauxite, various forms of carbonaceous materials, various forms of mullite-based raw materials, other aluminosilicate materials, and recycled spent refractories.

The term "taggant" refers to a substance that is added to a refractory component, where the taggant is identifiable after the "tagged" refractory product has been subjected to a metallurgical process and reached its service life. The taggant can have a stable phase, upon heating and cooling, or undergo one or more in situ changes including phase transformations/transitions, or reactions with the refractory component or atmosphere that translates to certain optical properties in the spent refractory material. The added taggant does not significantly decrease the purity of the refractory product and may improve other properties of the product.

The term "refractory material" refers to a mixture of refractory component and one or more of a taggant, binder, or antioxidant to be used for the formed, or unformed refractory product.

The term "refractory product" refers to a refractory material after any and all manufacturing treatment and finishing (i.e. forming, curing, tempering, firing, packaging, etc.); the end product, ready for installation and use, e.g., for steel production, other metal-making, non-metal making, chemical-making, gas-making, heat-making, or for high-temperature reactions, and the like. Refractory products are characterized by a high melting point, and are resistant to decomposition by heat, pressure, or chemical attack, and retain strength and form at high temperatures.

In accordance with the present invention, a taggant is incorporated into the composition of refractory material during the manufacturing process of a refractory product (i.e., an end product for use in lining a metallurgical vessel). The taggant, which may be an amorphous or crystalline solid, is designed into the refractory product so as not to diminish the high temperature properties of the refractory product, while providing the ability to identify source material and enable closed loop recycling of the refractory product after demolition. The added taggant does not significantly decrease the purity of the refractory product and may improve other properties of the refractory product. Preferably, the concentration of the taggant within the refractory material is 0.0001% to 1% by weight. The taggant can have a stable phase, upon heating and cooling, or in situ changes including phase transformations/transitions, or reactions with the refractory material or atmosphere that translates to certain optical properties in the spent refractory product.

The refractory product with the taggant can be used to form refractory linings of a metallurgical vessel. More importantly, when the refractory lining formed from such refractory product has reached the end of its service life and is demolished, the taggant can be used to identify and sort the refractory product from other types of refractory products and/or impurities for reclamation. In this regard, a radiation source and a detector can be utilized to identify the taggant and, based on the identified taggant, a diverter/ejector can be commanded to direct the demolished refractory products to an appropriate bin for reuse/recycling into new products. The radiation source and detector, for example, may utilize reflectivity and/or photoluminescence to identify the taggant (and thus the refractory product).

Referring to FIG. 1A, illustrated is an exemplary lining construction for a metallurgical vessel 10 to which principles of the invention may be applied. The lining construction includes a working lining 12 having a barrel region 14, a transition region 16, a slag line region 18 and a freeboard region 20. As shown in FIG. 1A, the transition region 16 is between the barrel region 14 and the slag line region 18, and the slag line region 18 is between the transition region 16 and the freeboard region 20. The working lining 12 has a first working lining side 12a (also referred to as the hot-face) and a second working lining side 12b (also referred to as the cold-face) opposite the first working lining side 12a, where the first working lining side 12a faces an inner molten metal and molten slag holding region 21 of the metallurgical vessel 10.

The lining construction further includes a backup lining 22 that is adjacent to and behind the working lining 12, and a bottom lining 24 is arranged adjacent to the barrel region 14. The bottom lining 24 includes a first bottom lining side 24a (also referred to as the hot-face) and a second bottom lining side 24b (also referred to as the cold-face) opposite the first bottom lining side 24a, where the first bottom lining side 24a faces the inner molten metal holding region 21. A sub-bottom lining 26 is disposed under and in contact with the second bottom lining side 24b. Arranged along a top portion of the lining construction is a flange 28 (also referred to as a lip ring), the flange 28 being distal from the bottom lining 24 and adjacent to a top edge surface of the working lining 12 (in particular the freeboard 20) and the backup lining 22. The sub-bottom lining 26 and backup lining 22 are supported by a steel structure 27 (also referred to as a ladle shell) that defines the outer dimensions of the vessel. One or more of the working lining 12, backup lining 22, bottom lining 24 and/or sub-bottom lining 24b may be formed from refractory products that include one or more taggants as described herein.

Figure 1B:
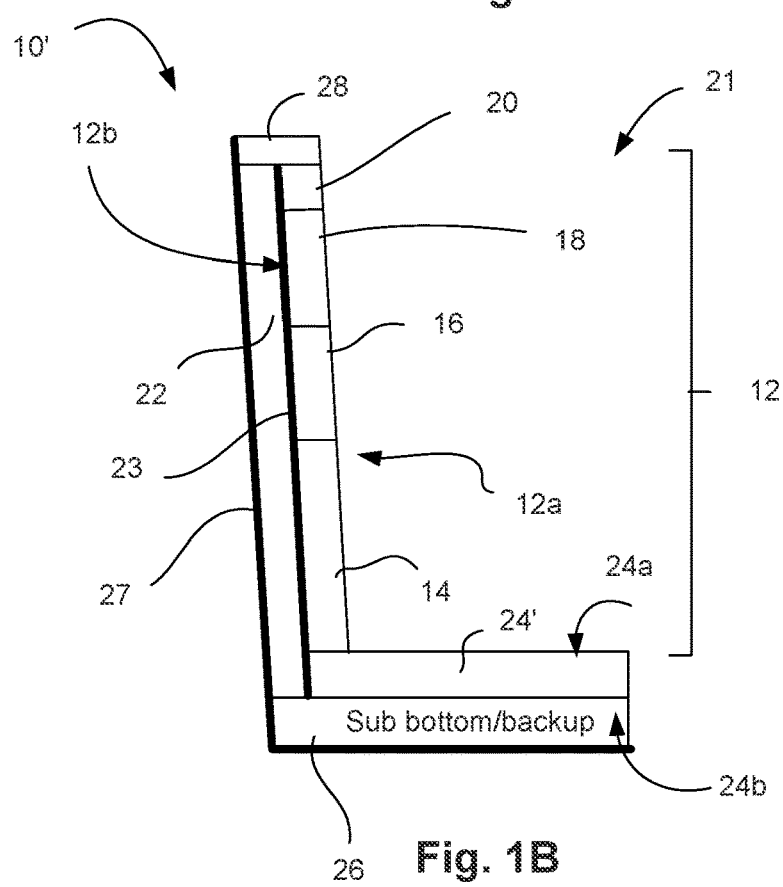

Briefly referring to FIG. 1B, illustrated is another exemplary lining construction for a metallurgical vessel 10' to which principles of the invention may be applied. The metallurgical vessel 10' of FIG. 1B is substantially the same as the vessel 10 of FIG. 1A, but has an "under barrel" bottom, also called full bottom, configuration. As can be seen in FIG. 1B, the working lining 12 is arranged over the bottom lining 24', which is in contrast to the vessel 10 of FIG. 1A in which the working lining 12 is adjacent to but not over the bottom lining 24.

Figure 2:
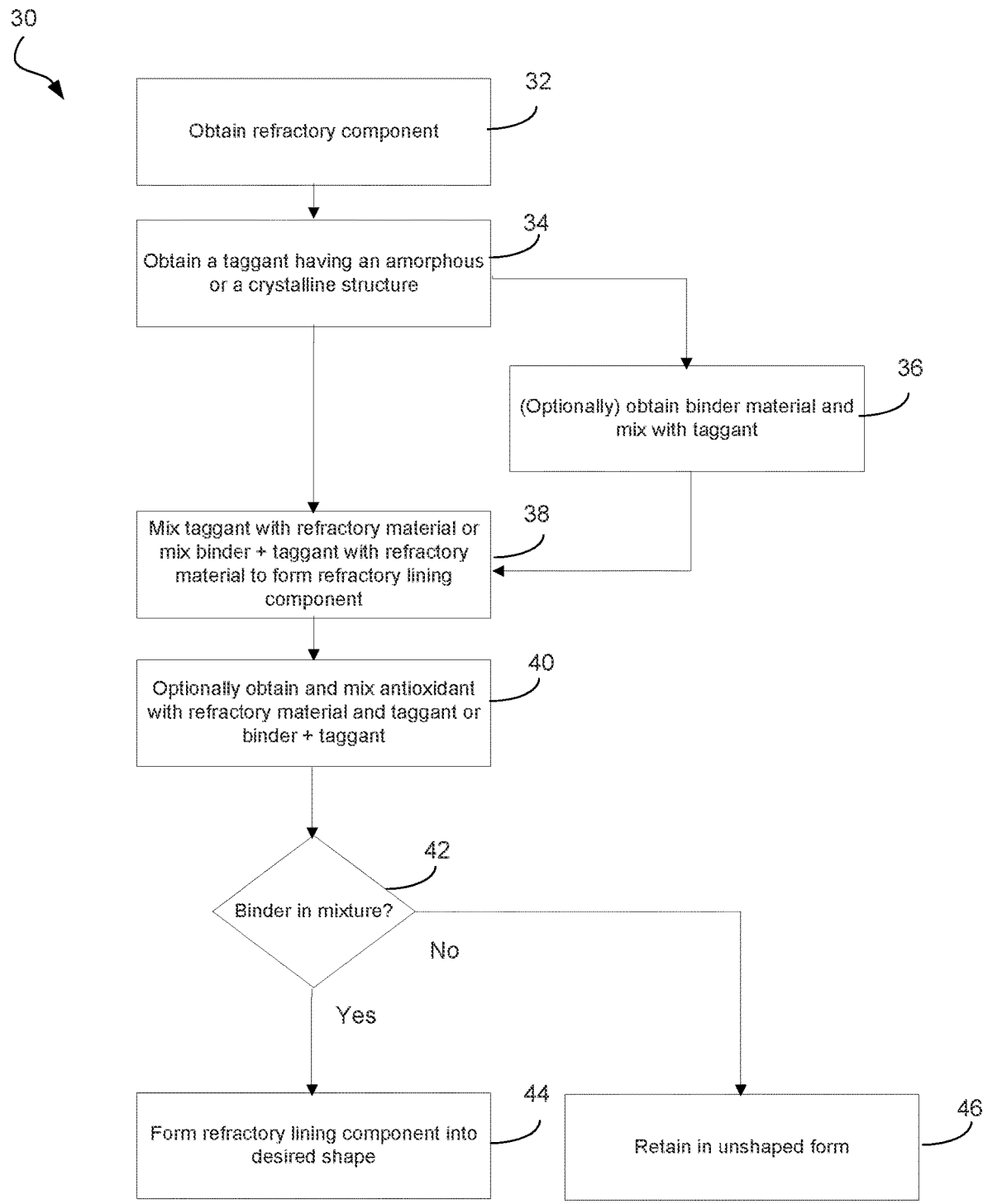
FIG. 2 is a flow chart showing the steps of an exemplary method for creating refractory product having a taggant in accordance with the invention.

Referring now to FIG. 2, illustrated is a flow chart disclosing a method 30 for forming a refractory product with a taggant in accordance with the invention. Beginning at step 32, one or more refractory components are obtained, where the one or more refractory components may be any refractory component used to form refractory products. Next at step 34 a taggant is obtained for mixing with the one or more refractory components, the taggant being an amorphous or a crystalline solid. In order to enable sorting, the taggant is configured to be distinguishable from refractory components of the refractory product after heating between 300 degrees F. and 3500 degrees F. In one embodiment, the taggant is configured to change form upon being subjected to a temperature exceeding 300 degrees F. For example, the taggant may undergo phase transitions (e.g., melting and solidification), redox reactions (oxidation/reduction), or reaction (dissolution and combination) with other constituents of the refractory (e.g., forming carbides, silicates, and other compounds). In one embodiment the taggant comprises a crystalline solid different from a crystalline part of the one or more refractory components. The crystalline solid may include metal, metal carbide or metal oxide. The taggant may be a metallic component that is configured to convert to an oxide or a carbide upon being subjected to a temperature exceeding 300 degrees F.

The taggant may comprise one or more of Nickel, Cobalt, Vanadium, Chromium, Copper, Barium, Tungsten, Platinum, Silver, Gold, Beryllium, Scandium, Yttrium, Lanthanum, Cerium, Praseodymium, Neodymium, Promethium, Samarium, Europium, Gadolinium, Terbium, Dysprosium, Holmium, Erbium, Thulium, or Ytterbium, Nickel carbide, Cobalt carbide, Vanadium carbide, Vanadium oxide, Copper carbide, Copper oxide, Barium Carbide, Barium Oxide, Tungsten Carbide, Tungsten oxide, Platinum Carbide, Platinum oxide, Silver Carbide, Silver oxide, Gold carbide, Gold oxide, Beryllium Carbide, Scandium Carbide, Yttrium Carbide, Lanthanum Carbide, Cerium Carbide, Praseodymium Carbide, Neodymium Carbide, Promethium Carbide, Samarium Carbide, Europium Carbide, Gadolinium Carbide, Terbium Carbide, Dysprosium Carbide, Holmium Carbide, Erbium Carbide, Thulium Carbide, Ytterbium Carbide, Beryllium Oxide, Scandium Oxide, Yttrium Oxide, Lanthanum Oxide, Cerium Oxide, Prascodymium Oxide, Neodymium Oxide, Promethium Oxide, Samarium Oxide, Europium Oxide, Gadolinium Oxide, Terbium Oxide, Dysprosium Oxide, Holmium Oxide, Erbium Oxide, Thulium Oxide, or Ytterbium Oxide.

In another embodiment, the taggant comprises an amorphous solid different from an amorphous solid part of the one or more refractory components. The amorphous solid may be a glass solid and may be in the form of glass microspheres. The glass solid may comprise one or more of an oxide of Scandium, Yttrium, Lanthanum, Cerium, Prascodymium, Neodymium, Promethium, Samarium, Europium, Gadolinium, Terbium, Dysprosium, Holmium, Erbium, Thulium, or Ytterbium.

Optionally, at step 36 a binder material is obtained for binding the one or more refractory components, and the binder material is mixed with the taggant. A binder material may be used, for example, when it is desired to have the one or more refractory components and taggant formed into specific shapes, e.g., bricks, etc. Examples of suitable binder materials include phenolic resin, pitch, phosphate, starch, sugar or sulfonate. If the one or more refractory components and taggant are to remain unformed, e.g., for use as a refractory concrete, then the binder material may be inactive or omitted and step 36 may be skipped.

At step 38 the taggant obtained in step 34, or the optional binder+taggant mix obtained in step 36, is mixed with the one or more refractory components to disperse the taggant throughout the resulting refractory product. Preferably, in mixing the components the taggant is homogeneously dispersed throughout the resulting refractory product.

It may be desirable to prevent or minimize oxidation of the taggant during use and/or after tear out of a lining formed from the refractory product. To this end, at step 40 an antioxidant may optionally be obtained and mixed with the one or more refractory components and taggant, or with the one or more refractory components and taggant+binder mixture. For example, an antioxidant in the form of a metal powder or metal granules may be added to the mixture. To be an effective reductant, the metal powder or granules should have a higher affinity for oxygen than the oxidizable taggant. The addition of an antioxidant to the mixture can prevent or reduce oxidation of the taggant and, hence, detectability of the taggant during a sorting phase remains optimal.

If at step 42 it is determined that the mixture includes a binder, then the method moves to step 44 where the resulting mixture is formed into a desired shape and cured. However, if at step 42 the mixture does not include a binder, then the method moves to step 46 and the mixture is left in an unshaped form. Accordingly, the resulting mixture may be shaped, unshaped, basic, non-basic, fired, unfired, cured, pressed, casted, etc. to form a refractory product for lining of a refractory.

Figure 3:
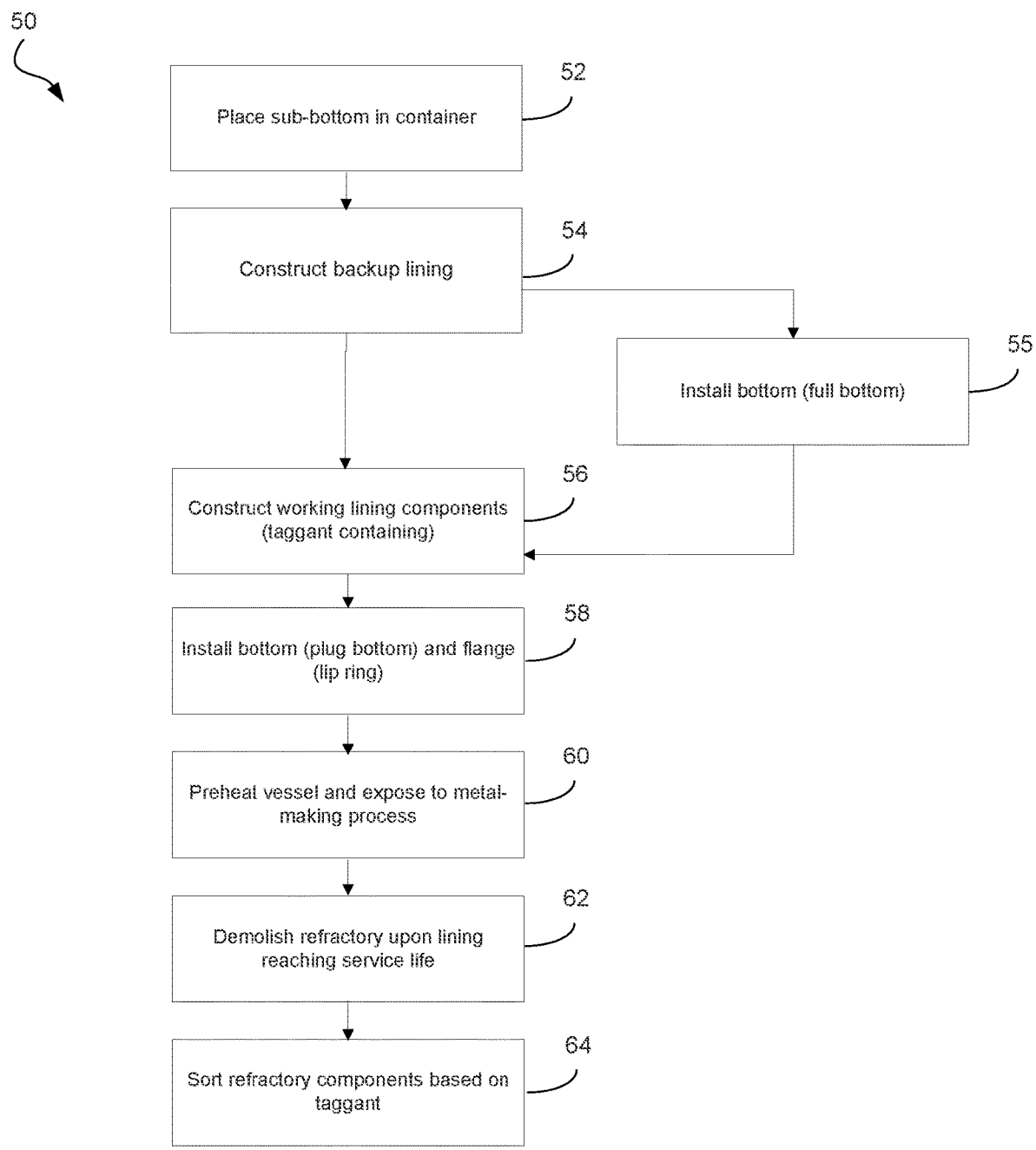
FIG. 3 is a flow chart showing steps of constructing a refractory lining and reclaiming pieces of spent refractory products from the lining in accordance with the invention.

Referring to FIG. 3, illustrated are exemplary steps of a method 50 for constructing a liner of a refractory vessel (e.g., a Steel ladle, EAF furnace, etc.) using a refractory product in accordance with the invention, and subsequently reclaiming refractory material after the liner has reached the end of its service life. Beginning at step 52, the refractory lining is assembled by placing a sub-bottom 26 within a container structure 27. Next at step 54, a backup lining 22 is arranged within a steel shell 27 of the refractory vessel to define an outer-most surface of the backup lining 22. If refractory vessel is to have a full bottom, then at step 55 such full bottom is installed. Then at step 56 a working lining 12 is formed adjacent to the backup lining 22, the working lining 12 defining an inner-most wall 12a of the metallurgical vessel 10. One or both of the backup lining 22 and/or the working lining 12 are formed using the refractory product (which includes a taggant) as formed in the method of FIG. 3. If both the backup lining 22 and the working lining 12 are formed with different types of refractory products, with two or more having a taggant, then the taggants of each different refractory product type should be different to enable identification of the respective refractory product types during a reclamation process as described below.

Next at step 58 the flange (lip ring) 28 is installed over the backup lining 22 and working lining 12, the flange 28 defining a top surface of the vessel. The flange 28 can be formed from Alumina-based castable or ram. Additionally, and assuming the vessel does not have a full bottom, a plug bottom is installed over the sub-bottom 26.

Next at step 60 the assembled refractory lining is placed into service, where the vessel is heated and exposed to a metal-making process, thereby exposing the working lining 12 to a high-temperature process. Once the refractory lining has reached a point in which it requires repair or replacement, the refractory lining is prepared for tear out and demolished as indicated at step 62 to produce a mixture of pieces of spent refractory products of different chemistry types (i.e., different types of refractory products) including carbon-bonded refractories. At step 64 the mixture of pieces of spent refractory products is subjected to a sorting process whereby the pieces are analyzed and sorted into groups based on properties of one or more taggants within at least some of the refractory products. For example, optical properties of the taggant, in changed or unchanged form, may be utilized to identify the type of taggant (and thus the type of refractory product). In this regard, the reflective and/or the photoluminescent properties of the taggant, in changed or unchanged form, may be used to determine the type of taggant. The refractory pieces then can be sorted based on the detected taggant and recycled to form new refractory products.

Figure 4:
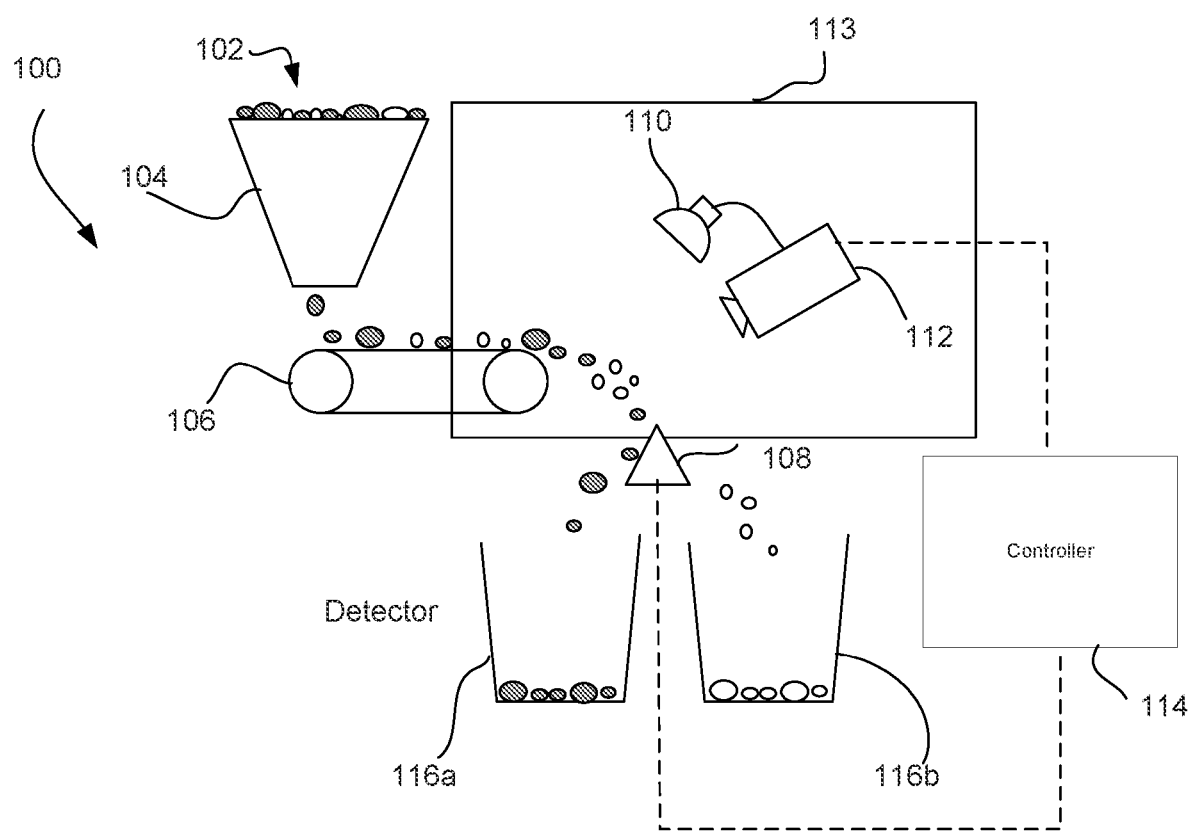
FIG. 4 is a schematic diagram of an exemplary system for sorting a mixture of demolished/crushed pieces of spent refractory products, some that include a taggant, in accordance with the invention.

Referring to FIG. 4, illustrated is a simple schematic diagram illustrating a system 100 for sorting demolished/crushed refractory product based on a taggant previously added to the refractory material. More specifically, a mixture of demolished/crushed refractory lining products 102 is collected and placed in a hopper 104. From the hopper, the mixture of refractory lining products 102 is deposited on a transport 106, such as a conveyor or the like, which directs the mixture to a diverter 108.

As the mixture of refractory lining material 102 approaches the diverter 108, an irradiation source 110, such as a light source, a laser, an X-ray source, etc., irradiates the mixture 102 while a detector 112 observes the results of the irradiation process. The irradiation source 110 and/or the detector 112 may be arranged within an enclosure 113 to reduce interference from visible light. The detector may employ spectroscopy, such as Laser Induced Breakdown Spectroscopy or any other suitable detection methodology, to analyze the irradiated refractory lining mixture. A controller 114 is communicatively coupled to the detector 112 and receives data from the detector 112. The controller 114, which may include dedicated logic circuitry, a processor that executes code stored in a memory, or a combination of both, processes the data to determine the presence of a taggant or, if multiple taggants are present, the type of the taggant. The controller 114 is operatively coupled to the diverter 108 and, based on the detected taggant, commands the diverter 108 to direct the pieces of refractory lining product 102 to either a first bin 116a or a second bin 116b, thus sorting the pieces of refractory products based on type. While sorting into only two bins is illustrated, it will be appreciated that further bins can be added depending on the needs of the specific application. Further, it will be appreciated that the illustrated system is exemplary, and other configurations may be utilized.

As noted above, detection of the taggant may be based on optical properties, such as reflectivity and/or photoluminescence. When using reflection to detect the taggant, the optical properties of that taggant that can be targeted include reflection, retro reflection, absorption, refraction, transmission and/or emission of electromagnetic radiation. When using retro reflection, the taggant, which may be in the form of glass beads, may be configured to reflect only a narrow band of wavelengths, while absorbing other wavelengths. Detection then can be focused on the presence of the narrow band of wavelengths. With respect to photoluminescence, a fluorescent or phosphorescent taggant that, when excited by the radiation source 110 of higher energy, shorter wavelength, such as X-ray or UV, emits radiation of lower energy, longer wavelength light, such as visible or infra-red, may be detected.

The system of FIG. 4 can rapidly sort chunks of material as well as ground refractory product (1-5 mm in diameter). The number of refractory product types and their absorption/emission spectra can be used to consider specific spectral bands. For example, in a steel mill that uses only a single quality MgO-C brick (black or brown appearance) and a high alumina castable concrete (dark grey or white appearance), use of the visible spectrum may be sufficient for sorting.

With the ability to simultaneously process a large quantity of granules (bonded refractory grain, either polymeric, ceramic, etc.), an additional benefit is gained in that the material can be crushed, cleaned and sized before scanning. This process in and of itself is a benefit to the overall raw material quality, as friable material such as slag and decarburized graphite may be predominantly removed.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A method of reclaiming refractory material of a refractory lining constructed from different types of refractory products, wherein at least some of the different types of refractory products are constructed by mixing at least one refractory component and a taggant, the taggant comprising an amorphous or a crystalline solid that is distinguishable from an amorphous or crystalline solid of the refractory component, the method comprising:
- assembling the refractory lining using at least two different types of refractory products, wherein at least one refractory product of the at least two refractory products comprises the taggant;
- subjecting the assembled refractory lining to temperatures in excess of 300 degrees F.;
- demolishing the refractory lining to produce a mixture of refractory pieces, the mixture of refractory pieces comprising a mixture of the at least two different types of refractory products;
- analyzing the mixture of refractory pieces to detect the presence of one or more taggants; and
- sorting the refractory pieces of the mixture of refractory pieces into groups based on the detected one or more taggants.

2. The method according to claim 1, wherein demolishing includes crushing the mixture of refractory pieces into smaller pieces.

3. The method according to claim 1, wherein analyzing comprises optically analyzing the refractory pieces.

4. The method according to claim 1, wherein analyzing comprises using Spectroscopy to analyze the refractory pieces.

5. The method according to claim 1, wherein analyzing comprises using laser-induced breakdown spectroscopy to analyze the refractory pieces.

6. The method according to claim 1, wherein analyzing comprises exciting the refractory pieces to cause photoluminescent emissions from the taggants, detecting the photoluminescent emissions, and sorting the refractory pieces based on the detected photoluminescent emissions.

7. The method according to claim 1, wherein analyzing further comprises detecting a type of taggant in at least some of the pieces.

8. The method according to claim 7, wherein detecting the type of taggant further comprises detecting that the taggant has changed from one state to another state.

9. The method according to claim 1, further comprising prior to assembling using at least one of a crystalline solid for the taggant different from a crystalline solid part of the refractory component or an amorphous solid for the taggant different from an amorphous solid part of the refractory component.

10. The method according to claim 1, further comprising prior to assembling shaping the mixture of the at least one refractory component and the taggant into a desired shape, and curing the shaped mixture.

11. The method according to claim 1, further comprising prior to assembling mixing the taggant with a binder material, and subsequently mixing the refractory component with the mixed taggant and binder material.

12. The method according to claim 1, further comprising prior to assembling mixing an antioxidant with the refractory component.

13. The method according to claim 12, wherein the antioxidant comprises at least one of a metal powder or metal granules.

14. The method according to claim 1, further comprising prior to assembling selecting a taggant that is configured to change form upon the refractory material being subjected to a temperature exceeding 300 degrees F.

15. The method according to claim 1, further comprising prior to assembling selecting the amorphous solid as the taggant.

16. The method according to claim 1, further comprising prior to assembling selecting the amorphous solid as the taggant, wherein the amorphous solid comprises glass microspheres.

17. The method according to claim 1, further comprising prior to assembling selecting the crystalline solid as the taggant, wherein the crystalline solid comprises at least one of Nickel, Cobalt, Vanadium, Chromium, Copper, Barium, Tungsten, Platinum, Silver, Gold, Beryllium, Scandium, Yttrium, Lanthanum, Cerium, Prascodymium, Neodymium, Promethium, Samarium, Europium, Gadolinium, Terbium, Dysprosium, Holmium, Erbium, Thulium, or Ytterbium.

18. The method according to claim 1, further comprising prior to assembling selecting the crystalline solid as the taggant, wherein the crystalline solid comprises at least one of Nickel carbide, Cobalt carbide, Vanadium carbide, Vanadium oxide, Copper carbide, Copper oxide, Barium Carbide Barium Oxide, Tungsten Carbide, Tungsten oxide, Platinum Carbide, Platinum oxide, Silver Carbide, Silver oxide, Gold carbide, Gold oxide, Beryllium Carbide, Scandium Carbide, Yttrium Carbide, Lanthanum Carbide, Cerium Carbide, Praseodymium Carbide, Neodymium Carbide, Promethium Carbide, Samarium Carbide, Europium Carbide, Gadolinium Carbide, Terbium Carbide, Dysprosium Carbide, Holmium Carbide, Erbium Carbide, Thulium Carbide, Ytterbium Carbide, Aluminum Oxide, Beryllium Oxide, Scandium Oxide, Yttrium Oxide, Lanthanum Oxide, Cerium Oxide, or Praseodymium Oxide, Neodymium Oxide, Promethium Oxide, Samarium Oxide, Europium Oxide, Gadolinium Oxide, Terbium Oxide, Dysprosium Oxide, Holmium Oxide, Erbium Oxide, Thulium Oxide, or Ytterbium Oxide.

* * * * *